No. 872,683. PATENTED DEC. 3, 1907.
J. RAY.
PIE PAN LIFTER.
APPLICATION FILED MAR. 21, 1904. RENEWED OCT. 23, 1907.
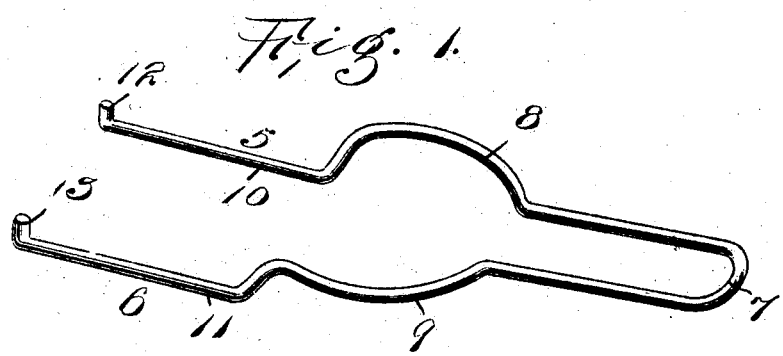
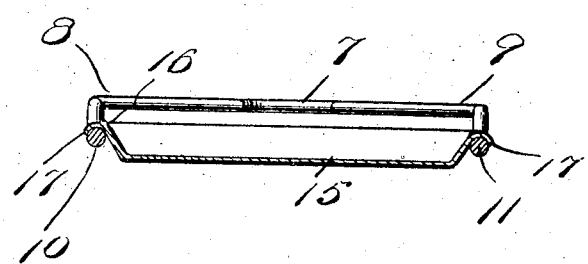
Witnesses
Inventor
Joseph Ray
Attorneys

UNITED STATES PATENT OFFICE.

JOSEPH RAY, OF DECATUR, ILLINOIS.

PIE-PAN LIFTER.

No. 872,683. Specification of Letters Patent. Patented Dec. 3, 1907.

Application filed March 21, 1904, Serial No. 199,138. Renewed October 23 1907. Serial No. 398,844.

*To all whom it may concern:*

Be it known that I, JOSEPH RAY, a citizen of United States, residing at Decatur, in the county of Macon, State of Illinois, have invented certain new and useful Improvements in Pie-Pan Lifters; and I do hereby declare the following to be a full, clear, and exact description of the invention, such as will enable others skilled in the art to which it appertains to make and use the same.

This invention relates to pans and handles therefor, the object of the invention being to provide a pan having retaining clips or ears, and a handle adapted for engagement with and disengagement from the pan, a further object of the invention being to provide a cheap and simple device that may be readily applied and removed.

In the drawings forming a portion of this specification and in which like numerals of reference indicate similar parts in the several views Figure 1 is a detailed perspective view showing the handle disconnected from a pan. Fig. 2 is a view showing the pan with the handle connected.

Referring now to the drawings, the handle is formed of a single piece of heavy spring wire which is bent upon itself to form parallel members 5 and 6 having a connecting bight 7, and at the ends of which members 5 and 6, the wire is bent into arc shape as shown at 8 and 9. At the ends of the arc shaped portions 8 and 9 the wire is bent downwardly at obtuse angles, is then bent forwardly at right angles to form the parallel members 10 and 11, and is finally turned upwardly at right angles to form the stops 12 and 13. The plate to which this handle is applied is shown at 15 and at diametrically opposite points of the rim 16 thereof are formed radiating ears 17 which are bent downwardly as shown.

When the handle is to be applied to the pan, the grasping portion between the members 5 and 6 is grasped and the handle is compressed so as to move the portions 10 and 11 toward each other. They are then engaged under the flange 16 and with the ears 17, the handle being then released the spring quality of the wire of which it is formed causes the members 10 and 11 to move away from each other and tightly engage the ears or clips, the shoulders or stops at both ends of the portions 10 and 11 limit the sliding movement of the pan with respect to said portions 10 and 11, and the pan is held securely. With this construction it will be seen that when the holder is applied to a pan, the portions 5, 6, 8 and 9 lie above the pan and thus are kept from heating. When the handle is to be removed, it is only necessary to squeeze it to bring the members 10 and 11 toward each other and out of engagement with the ears.

What is claimed is,

1. A pan handle consisting of a single piece of wire which is bent upon itself to form parallel members, and a connecting bight, the wire at the ends of said parallel members being bent outwardly in arc shape, then downwardly and parallel, then forwardly and parallel at right angles to the downwardly bent portions, and then upwardly at right angles, the parallel and arc shaped members being adapted to spring from the bight.

2. The combination with a pan having an outwardly directed flange at its upper edge and having clips at diametrically opposite points bent downward from the flange, of a handle consisting of a single piece of wire bent to form parallel members having a connecting bight whereby the parallel members may be moved toward and away from each other, said parallel members being disposed against the under side of the flange and removably engaged with the ears, the bent wire having portions intermediate its ends and bight curved outwardly, the outwardly directed portions and bight being disposed in a plane higher than the plane of the free ends of the wire.

3. A pan lifter consisting of a single piece of wire bent upon itself to form spaced members, said spaced members comprising parallel portions, portions curved outwardly from said parallel portions and having their terminals lying outwardly of the said parallel portions and turned downwardly and thence forwardly to form other parallel portions lying in a plane parallel to the plane occupied by the first-named parallel portions, said last-named parallel portions having their ends turned upwardly at right angles to the said portion.

In testimony whereof I hereunto sign my name in the presence of two subscribing witnesses on the 19th day of January 1904.

JOSEPH RAY.

Witnesses:
C. W. MARTINIE.
J. M. GRAY.